United States Patent
Brown, Jr.

[15] 3,661,482
[45] May 9, 1972

[54] APPARATUS FOR MANUFACTURING BIAXIALLY ORIENTED FILM WITH DIMENSIONAL STABILITY

[72] Inventor: Stuart L. Brown, Jr., 732 Ashby Drive, Waynesboro, Va. 22980

[22] Filed: Aug. 28, 1968

[21] Appl. No.: 756,061

[52] U.S. Cl. ................... 425/66, 425/72, 425/71, 425/93, 264/95, 264/342
[51] Int. Cl. ................. B29c 17/07, B29c 25/00, B29d 23/04
[58] Field of Search .................. 264/95, 209, 342, 230; 18/14 A, 14 S, 14 M, 1 FB, 1 FS, 14 C

[56] References Cited

UNITED STATES PATENTS

| | | |
|---|---|---|
| 2,301,222 | 11/1942 | Minich................................264/342 X |
| 2,433,937 | 1/1948 | Tornberg............................18/14 S X |
| 2,517,570 | 8/1950 | Irons..................................264/342 |
| 2,955,321 | 10/1960 | Fortner et al.........................264/95 |
| 2,987,767 | 6/1961 | Berry et al. ..........................264/95 |
| 3,090,998 | 5/1963 | Heisterkamp et al..................264/95 |
| 3,193,547 | 7/1965 | Schott, Jr............................18/14 S X |
| 3,268,640 | 8/1966 | Gerber................................264/95 |

Primary Examiner—Robert F. White
Assistant Examiner—Jeffery R. Thurlow
Attorney—Joseph Januszkiewicz

[57] ABSTRACT

An apparatus is disclosed wherein a plurality of spaced mandrels accurately control expansion and stress relief of thermoplastic tubing in cooperation with means for lubricant assuring uniform operation.

8 Claims, 12 Drawing Figures

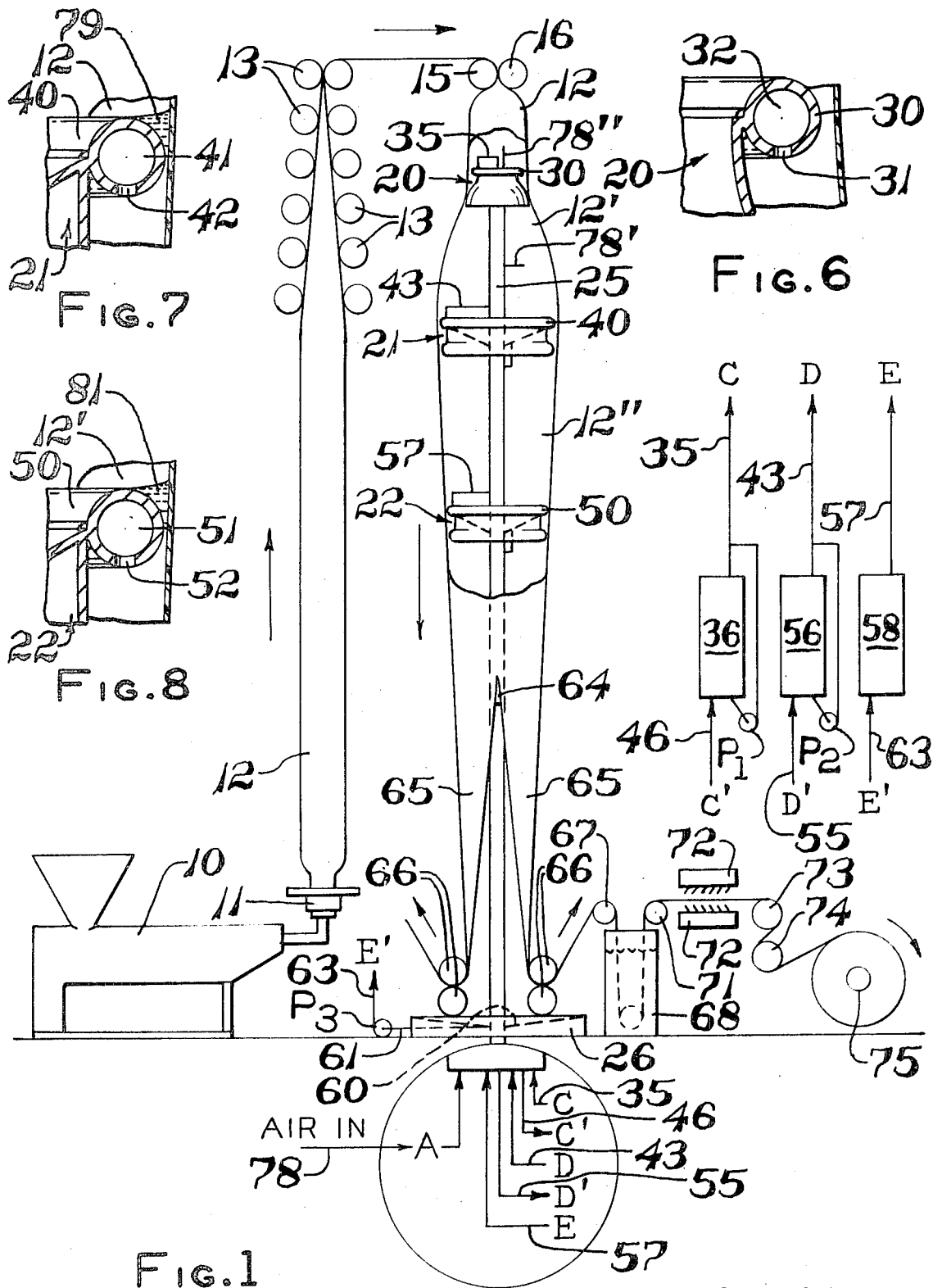

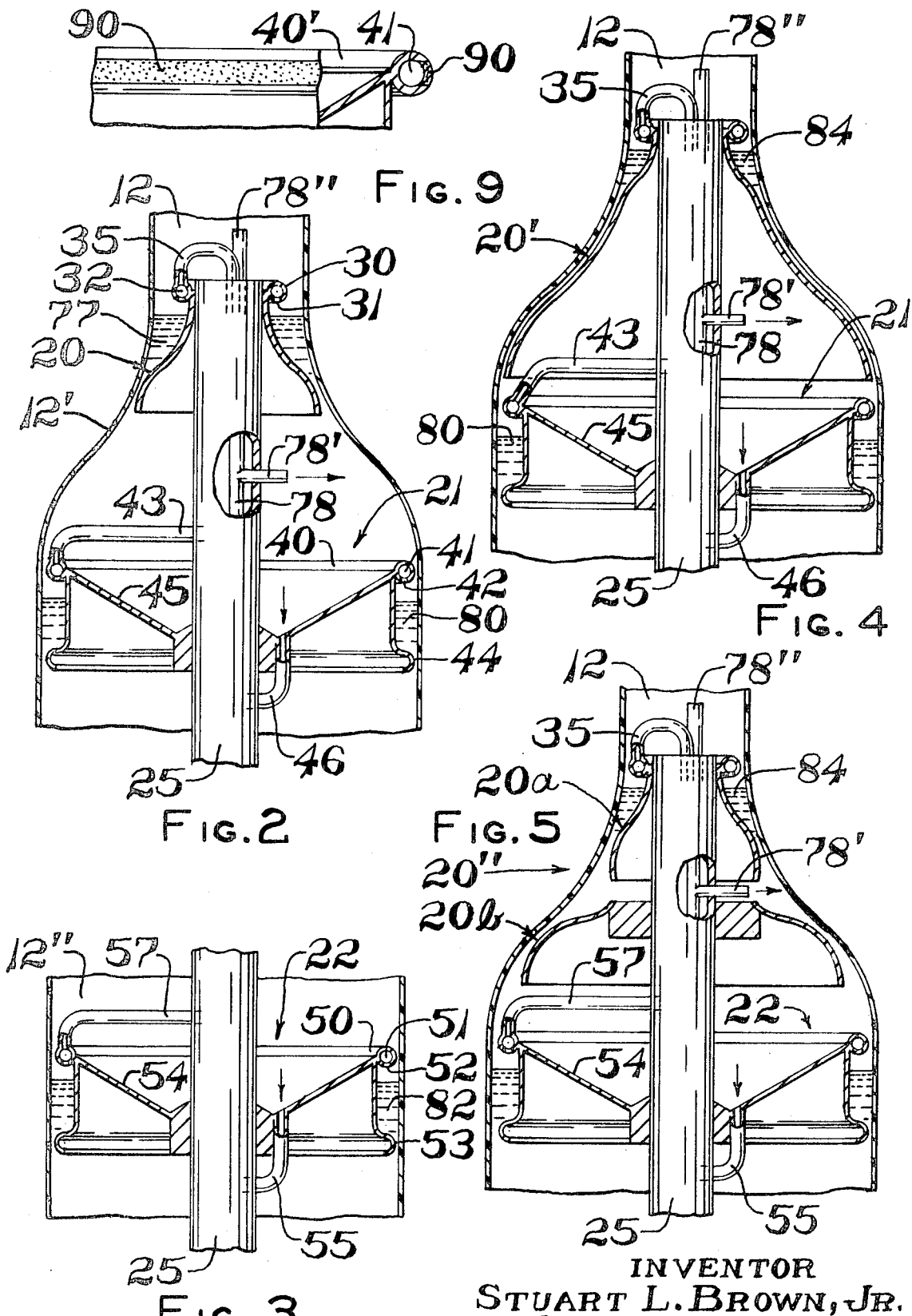

INVENTOR
STUART L. BROWN, JR.
BY Joseph Januszkiewicz ATTY.

APPARATUS FOR MANUFACTURING BIAXIALLY ORIENTED FILM WITH DIMENSIONAL STABILITY

BACKGROUND OF THE INVENTION

This invention relates to an apparatus for producing a thin wall tubing or film and more particularly to an improved apparatus which permits production of biaxially oriented thermoplastic resinous film having improved physical properties including dimensional stability.

In the fabrication of film for packaging which has the shrink-back capabilities, several types of material are adaptable for such use, including polyethylene, polypropylene and polyvinyl chloride. The polyethylene shrink film which is cross-linked either by irradiation or by chemical reaction has excellent shrinkage and high tensile strength, but it has the disadvantage of poor clarity, low surface gloss and weak resistance to cutting abrasion and tear propagation. Non-cross-linked polyethylene film is produced which is oriented but has two major deficiencies: (1) the shrinkage is only recoverable at the melt range, i.e. at the high temperatures which make it difficult to handle and (2) there is essentially no shrink at these high temperatures. In addition there is little improvement in tensile and yield strength as a result of orientation of non-cross-linked polyethylene film. The use of polypropylene film for packaging has limited use because of the narrow range between initiation of shrinkage and film melting thereby making the control of the packaging operation exceedingly difficult. Oriented polyvinyl chloride films have the feature of clarity, high strength, good tear resistance as well as good shrink-back characteristics. The chief process by which polyvinyl film is manufactured utilizes the tenter frame method which, however, has the disadvantage of higher scrap and higher cost of capital equipment. The present invention contemplates the use of an improved apparatus whereby the blown polyvinyl chloride film has all the above-mentioned advantages, yet reduces the cost of manufacturing, minimizing scrap and improves dimensional stability to make it commercially feasible.

SUMMARY OF THE INVENTION

The present invention contemplates the use of a plurality of spaced mandrels which accurately control the expansion and stress relief of a thermoplastic tube in cooperation with a heated lubricant which assures uniform operation and wall thickness.

It is an object of the present invention to provide a new and improved apparatus for making film from resinous tubing. A further object of this invention is to provide a new and improved apparatus for making a thin thermoplastic resinous film having extremely uniform wall thickness. Another object of this invention is to provide a novel apparatus for preparing thin oriented thermoplastic film through the use of a plurality of mandrels which are cooperative to perform the biaxial orientation of the film and the controlled shrink back which provides dimensional stability to the film. A further object of this invention is to provide an apparatus which makes a polyvinyl chloride film that is dimensionally stable.

These and other objects and advantages of the invention will appear more fully in the following detailed description when considered in connection with the accompanying drawings.

BRIEF DESCRIPTION OF THE DRAWINGS

FIG. 1 is a schematic representation with a portion of the film broken away showing the essential elements of one embodiment of the invention for manufacturing tubular film in accordance with the principle of the invention.

FIG. 2 is an enlarged fragmentary cross-sectional elevational view of the uppermost two mandrels shown in FIG. 1.

FIG. 3 is an enlarged fragmentary cross-sectional elevational view of the lowermost mandrel.

FIG. 4 is an enlarged fragmentary cross-sectional view of a modified form of the mandrels.

FIG. 5 is an enlarged fragmentary cross-sectional view of a further modified form of mandrels in accordance with the principles of the invention.

FIG. 6 is an enlarged fragmentary cross-sectional view of the uppermost portion of the upper mandrel.

FIG. 7 is an enlarged fragmentary cross-sectional view of the uppermost portion of the intermediate mandrel.

FIG. 8 is an enlarged fragmentary cross-sectional view of the uppermost portion of the lower mandrel.

FIG. 9 is an enlarged fragmentary view of a modified form of a mandrel with a portion thereof broken away.

DESCRIPTION OF THE EMBODIMENTS

Figure 10:
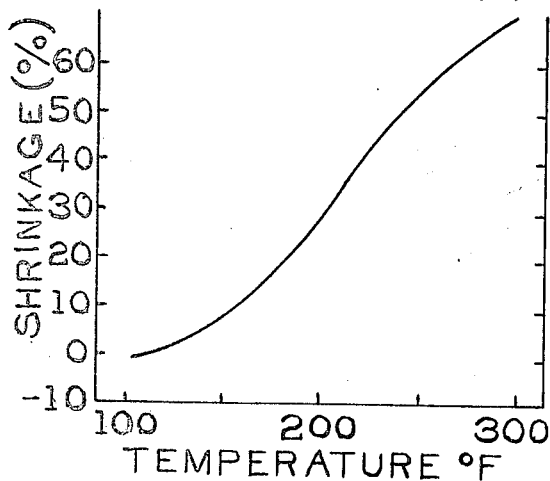
FIG. 10 is a chart illustrating the thermal properties of biaxially oriented PVC film.

Referring to the drawings wherein like reference characters designate like or corresponding parts throughout the several views, there is shown in FIG. 1 an extruder 10 which may be jacketed for a temperature controlling medium in the usual way, which extruder 10 extrudes through the die 11 a thermoplastic material in the form of a tube 12. The tube 12 through the extruder 10 is expanded only slightly with sufficient air pressure to maintain such tube 12 at a predetermined diameter and gauge in a manner old and well known in the art. The thermoplastic tube is conveyed generally in an upward direction as shown and is gradually collapsed at room temperature by a collapsing frame which is generally a set of driven converging rollers 13 whereby the walls of the tubing are brought into substantially parallel spaced relationship. The collapsed tubing is then conveyed laterally and thence downwardly for passage by and between the bight of a pair of cooperating supply nip or pinch rolls 15 and 16. The freshly extruded tube 12 is thence passed downwardly over a plurality of spaced mandrels 20, 21 and 22 suitably connected to an upwardly extending tubular support 25. Tubular support 25 is suitably mounted on a base 26.

Mandrel 20 is of a bell-type configuration having an annular ring 30 (FIG. 2) secured to its uppermost end portion. Ring 30 has a plurality of circumferentially spaced bores 31 at its lowermost end portion thereof communicating with a central extending passageway 32. A conduit 35 (FIG. 2) extending upwardly through the tubular support 25 communicates with the central passageway 32 of annular ring 30 to provide for the passage of the liquid thereto and to the respective bore openings 31. Although conduit 35 is shown as connecting directly to the annular ring 30, conduit 35 may be connected to a manifold which may have several conduits connected to the annular ring 30 to provide for a better distribution of fluids from conduit 35 to ring 30. Conduit 35 is connected to a reservoir 36 which has suitable heaters connected thereto to heat the liquids or water therein to a controlled temperature. Suitable controls are provided in a manner old and well known in the art to maintain the temperature of the liquids contained therein. A pump $P_1$ is operative on conduit 35 to provide the necessary pressure to convey the heated liquid through the conduit 35.

Mandrel 21 is of generally cylindrical configuration having an annular hollow ring 40 connected to the uppermost end portion, which ring 40 has a central circumferentially extending passageway 41 and a plurality of circumferentially spaced bores 42 at the lowermost end portion thereof. A conduit 43 (FIG. 2) extending upwardly through tubular support 25 communicates with the central passageway 41 of annular ring 40 to supply fluid thereto for a purpose to be described. The lower portion of mandrel 21 has a circumferentially extending arcuately shaped abutment 44 whose outer diameter is greater than that of ring 40 to determine the diameter of the tubular film being processed in a manner to be described. Mandrel 21 has a funnel shaped trough 45 which collects liquid for passage to a conduit 46 which conduit enters tubular support 25 and extends therethrough for connection to the inlet means of reservoir 36. It will thus be observed that the heated liquid from reservoir 36 (FIG. 1) is pumped via pump $P_1$ and conveyed via conduit 35 for distribution via ring 30 (FIG. 6) and collected via trough 45 for discharge into conduit 46 for conveyance to reservoir 36.

Mandrel 22 (FIG. 3) is of a generally cylindrical shape having at its uppermost end portion annular ring 50 with a central passageway 51 extending therethrough. Annular ring 50 has a plurality of spaced bores 52 along the lower portion thereof that communicate with the central passageway 51. The lowermost portion of mandrel 22 has a circumferentially extending arcuately shaped abutment 53 whose outer diameter is less than that of abutment 44 to control the shrink-back of the tubular film to be described. Mandrel 22 has a downwardly extending funnel-shaped trough 54 which collects liquids for passage into a conduit 55, which conduit 55 enters tubular support 25 and extends therethrough for connection to the inlet supply means of a reservoir 56. Suitable heater means are provided for reservoir 56 which heats the liquid to a predetermined temperature for conveyance via conduit 43 to annular ring 40. A pump $P_2$ is operative on conduit 43 to provide suitable controlled pressure for the liquid being delivered by conduit 43.

Ring 50 of mandrel 22 has a conduit 57 communicating therewith, which conduit 57 extends laterally for entrance into tubular support 25 and extends downwardly through tubular support 25 for connection to the outlet means of reservoir 58. Reservoir 58 stores liquid which is cooled by a suitable heat exchanger to a controlled temperature which cooled liquid is then pumped via a pump $P_3$ in a manner to be described. Controls are provided in a manner that is old and well known in the art to maintain the desired temperature. The base 26 has a funnel-shaped trough 60 with a drain conduit 61 connected to the pump $P_3$ which pumps the liquid collected by drain conduit 61 for delivery via conduit 63 to reservoir 58.

Suitably mounted on tubular support 25, intermediate the lower mandrel 22 and the base 26 is a pair of laterally spaced knives 64 (only one shown in FIG. 1) to slit the tubular film as it is conveyed past the lower tubular mandrel 22 into two equal width film strips 65—65 for advancement to nip driven rollers 66—66. The nip rollers 66—66 are driven at a faster relative rate than the advancing of the tube from the supply nip rolls 15–16 such that relative difference in speed provides for machine direction orientation of the processed film strips 65—65. The processing of both film strips 65—65 is similar; however, only the one is shown wherein the one strip 65 is conveyed over guide roll 67 into a bath 68 which washes the film strip. Thereafter, such film strip is guided over guide roll 71 for passage between a plurality of air knives indicated generally as 72 which remove all liquid therefrom. The film strip is then conveyed over rollers 73 and 74 for wind-up onto take-up reel 75.

In operation, the extruder 10 extrudes through die 11 a tube 12 which is drawn upwardly by pairs of converging driven nip rollers 13 to gradually collapse the tube 12. The flattened tube 12 is then conveyed laterally and thence downwardly for movement between driven rollers 15 and 16 for passage over mandrel 20. Air pressure supplied from a suitable source not shown is conveyed via conduit 78, upwardly through the base 26 (FIG. 1) and through the tubular support 25 to the juncture of conduits 78' and 78" (FIG. 2). Conduit 78" pressurizes the chamber defined by the tubular film, mandrel 20 and the nip rollers 15 and 16 to inflate the tube 12 to its original extruded size. Liquid in reservoir 36 which is heated to approximately 200°–225° F. is pumped by a pump $P_1$ and conduit 35 upwardly through tubular support 25 for discharge into annular ring 30 which regulates the flow of the heated liquid through the circumferentially spaced bores 31 which then flows into the clearance space defined by the film and the mandrel 20 to form a reservoir of liquid designated generally as 77 (FIG. 6).

Such reservoir of heated liquid 77 transfers heat uniformly to the film and quickly brings the temperature thereto to the desired temperature which in the example is 210° F. effecting a stretching of the film as it passes over the bottom portion of such mandrel 20 and permits the further continuous stretching as it passes toward and over the outer surface of abutment 44. The stretching between the mandrel 20 and abutment 44 is a continuous stretching. The heated liquid 77 which is trapped by the lower portion of the mandrel 20 and the film 12 operates to lubricate the inner surface of the film as it is drawn over the lower portion of the mandrel 20. Thereafter such liquid is collected by the wiping action of the ring 40 and builds up into a small annular reservoir of liquid 79 (FIG. 7) such that the excess flows down into a funnel-shaped trough 45 for conveyance by a conduit 46 to the inlet portion of reservoir 36 for further conditioning and heating. The liquid further acts as a lubricant as it passes over ring 40. Pressurized air is pumped via conduit 78 through tubular support 25 for discharge via conduit 78' to the chamber defined by the inner circumferentially extending film designated 12' (as shown in FIG. 2) and by the mandrels 20 and 21 to pressurize such chamber to stretch the film and to prevent the film under expansion from sagging. Liquid via reservoir 56 which is heated to approximately 150°–170° F. is pumped by a pump $P_2$ via conduit 43 to the annular ring 40 for discharge to a liquid reservoir designated 80 (FIG. 2) defined by the outer circumferentially extending surface of the lower portion of mandrel 21 and the inner surface of the tubular film adjacent thereto to maintain the temperature of the film at approximately 160° F. and additionally operates as a lubricant as such film is drawn over the lower portion of such mandrel 21 to complete the stretching of such tubular film which is stretched to a ratio of 2.75 to 1 or in the range from 2.25 to 3.0 to 1 in the machine direction as well as in the transverse direction to thereby provide for biaxial orientation. As such film 12' is drawn over and past the abutment 44 of mandrel 21, the heated liquid which acts as a lubricant is collected by the wiping action of the ring 50 and builds up into a small annular reservoir of liquid 81 (FIG. 8) such that the excess flows down into a trough-shaped funnel 54 of mandrel 22 for passage via conduit 55 to the reservoir 56 for re-heating and re-circulation. As such film is drawn downwardly toward mandrel 22 such film is allowed to shrink back in the transverse direction to provide dimensional stability to such film at the low temperature range since mandrel 22 is of a smaller diameter than mandrel 21 and the film 12" is heated and capable of shrink-back. Through such shrink-back, the film is relieved of abnormally high stresses to ensure dimensional stability in the transverse direction, particularly at the low temperature range. This is important in the transporting of the film in roll form as where the temperature reaches 120° F. or above in transit. Under these conditions where the film is stress relieved there will be no change and correspondingly you have a product which will retain its dimensions. Otherwise you would have a distorted roll of film. It is through the built-in stresses that plasticized vinyl has a tendency to creep at relatively low temperatures causing roll deformation and in certain cases distortion of the package. Stress control is therefore important and critical. Through the described process a product is obtained that has internal stresses built into the material by stretching and once built in it is desirable to maintain these stresses at the high range while minimizing them at the lower temperature range. As such film is drawn over mandrel 22 it comes in contact with water reservoir 82 (FIG. 3) wherein such liquid is cooled to approximately 70° F. The liquid in reservoir 82 is cooled to 70° by a heat exchanger suitably operative upon reservoir 58 which has its liquid pumped by pump $P_3$ via conduit 57 for discharge into such reservoir 82. Such heated water in reservoir 82 operates to simultaneously lubricate and cool the tubular film designated 12" as it passes over such mandrel 22. The excess liquid from reservoir 82 which passes mandrel 22 is collected at the lower portion in a funnel-shaped trough 60 of base 26 and pumped via pump $P_3$ and conduit 63 to reservoir 58 where such liquid is cooled in accordance with the desired temperature such as to maintain the water in reservoir 82 at 70° F. As such film is pulled past mandrel 22, it is slit into two equal strips of film 65—65 by a pair of laterally spaced knives 64 such that the film strips 65—65 are pulled between a pair of nip rollers 66 at a desired relative speed for passage into the bath 68 and thence past the air knives 72—72 for subsequent wind-up onto reels 75 in a manner well known and understood in the art. Such described apparatus and method utilize a liquid medium which is superior to the use of air or an air bubble since the heat exchange between air and film is more difficult to control than when liquid is used because of the boundary layer developed which is affected by air velocity at the point of impingement, and which air velocity is difficult to control.

Through the use of the above-described process, dynamic self-stability is provided wherein a head of water referred to as water reservoirs 77, 80 and 82 prevent pulsations in the diameter of the tube. Were the liquid level of reservoir 77 to build up, the more pressure would be exerted on the tubular film and consequently the film would be expanded until the level dropped off to the preset level; whereas if the level of the water reservoir would drop, then less pressure would develop and the film would contract and tend to hold back the flow thereof, effecting a build-up in the level thereof.

Figure 11:
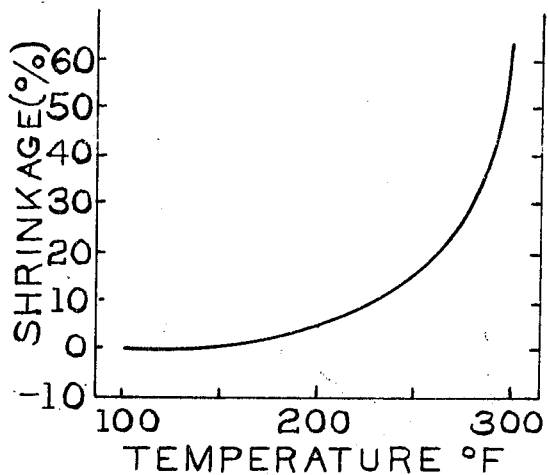
FIG. 11 is a chart illustrating the thermal properties of biaxially oriented polypropylene film.
Figure 12:
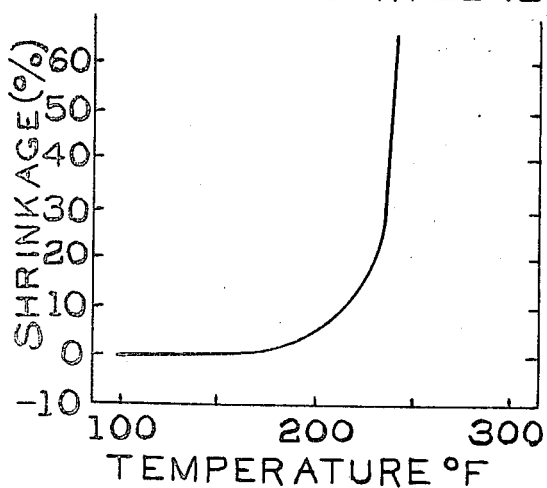
FIG. 12 is a chart illustrating the thermal properties of extruded polyethylene blown film.

To illustrate the capabilities and advantages of the present apparatus and method consider FIG. 10 which illustrates the shrink property of biaxially oriented polyvinyl chloride film wherein the ordinate of the left scale illustrates the percent of shrinkage, while the ordinate of the right scale indicates shrink tension and the abscissa indicates the temperature. When the tubular film is blown under the method as described above and thence cooled, it has the property of shrink back. As seen in FIG. 10, at 250° F. as wherein heat is applied to effect the shrink back, there is approximately 50 percent shrink-back capability, while at 200° F. approximately 30 percent shrink-back capability; whereas as seen in FIG. 11 for biaxially oriented polypropylene film the shrink-back capability at 250° and 200° F. is approximately 15 percent and 4 percent, respectively. FIG. 12 illustrates similar thermal properties of polyethylene blown film having little comparable shrink-back capabilities. Thus it will be observed that PVC blown film has greater capability of shrink-back than the other films to perform the function in shrink packaging for bundling, shipping containers, pallet overwrapping and general packaging.

A modification of the upper two mandrels is shown in FIG. 4 wherein like parts are designated by like numerals as in the original described embodiment. Herein upper mandrel 20' is of a conical shaped configuration attached to the tubular support 25; however, the outer surface of the mandrel is longitudinally extending to gradually effect the controlled expansion of the tubular film. In this case only a small annular reservoir of liquid 84 is maintained to provide for the heating of the film and to act as a lubricant thereof.

A further modification of the mandrel is shown in FIG. 5 wherein mandrel 20'' is composed of an upper section 20a and lower section 20b such that sections 20a or 20b can be replaced by other suitable contoured sections to facilitate the shaping or expansion of the film.

Another modification of the mandrel is shown in FIG. 9 wherein the annular ring 40 of the mandrel 21 is composed of a ring 40' having a central passageway 41 and an annular circumferentially extending sintered section 90 in lieu of the plurality of circumferentially spaced bores 42 to effect the lateral flow of water from the passageway 32 which acts to lubricate the film as it is drawn over mandrel 21. This embodiment is adapted to those shown in FIGS. 2, 4 and 5.

The operation of these embodiments is similar to that of the original described embodiment wherein greater control is obtained in the lubrication of the film, and in the shaping thereof as well as better heat transfer. Although the embodiments have been described as using liquids, gases are contemplated within the scope of this invention wherein the heated air operates to transfer heat to the film to prepare the film for expansion and annealing similarly to that described above.

I claim:

1. An apparatus for collapsing an expanded thermoplastic tubing comprising a pair of supply rolls for receiving thermoplastic tubing, a plurality of mandrels having their axes in alignment to each other and to said supply roll to define a pass line for the tubing, certain ones of said mandrels being of progressively increasing diameters, the remaining one of said mandrels being furtherest from said supply rolls and being of a diameter less than the nearest adjacent preceding mandrel wherein said adjacent mandrel is one of said certain mandrels to thereby effect transverse controlled shrink-back of the expanded tubing, means operatively connected to said mandrels for pressurizing the chambers defined by the tubing and said mandrels to facilitate the stretching of the tubing, the outer edges of all of said certain mandrels cooperate with the tubing to define annular reservoirs, means for conveying heated liquid to said annular reservoirs to heat said tubing adjacent thereto and to act as a lubricant, said remaining mandrel and said tubing adjacent thereto cooperative to define a cylindrical shaped reservoir, means for supplying cooling liquid to said cylindrical reservoir for cooling said tubing passing adjacent thereto below the mastic state of said tubing.

2. An apparatus for processing thermoplastic tubing comprising a support member, said support member having first mandrel means with an increasing diameter in its longitudinal direction, a second mandrel mounted on said support member having an annular abutment on the lowermost end portion thereof, said annular abutment of said second mandrel having a diameter greater than the diameter of said first mandrel means, a third mandrel mounted on said support member having an annular abutment on the lowermost end portion and being of a diameter less than said annular abutment on said second mandrel, said first mandrel and said annular abutment of said second mandrel cooperative with the inner wall surface of said tubing to define a pair of annular liquid reservoirs, means operatively connected to said annular liquid reservoirs for supplying heated liquids to said reservoirs for heating said tubing, pressurizing means connected to said support member adjacent to said first and second mandrel means for pressurizing the chamber defined by said first and second mandrels and the inner surface of said tubing, said third mandrel and said abutment of said third mandrel being cooperative with the inner surface of said tubing to define a circular reservoir, and means operatively connected to said cylindrical reservoir for supplying cooling liquids to said cylindrical reservoir for annealing said tubing passing into contact therewith.

3. An apparatus as set forth in claim 2 wherein said first mandrel is an elongated conical shaped member to effect a gradual increase in the expansion of a tubing passing thereover.

4. An apparatus as set forth in claim 3 wherein said mandrels have an outer annular sintered portion for effecting lateral flow of liquid from the mandrel toward the outer periphery to lubricate the inner surface of the tube as it is pulled over said mandrels.

5. An apparatus as set forth in claim 2 wherein said second and third mandrel each has a trough for collecting liquids from said tubing for passage back to a conditioner for heating and for recirculation to said annular liquid reservoirs.

6. An apparatus as set forth in claim 5 wherein each of said mandrels has an annular ring at their upper end portions for regulating the flow of liquids into said reservoirs immediately therebelow, and said rings of said second and third mandrels are cooperative with the inner surface of said tubing to wipe off the excess liquid therefrom for diverting said excess liquid in said reservoirs adjacent thereto.

7. An apparatus for manufacturing biaxially orientated film comprising support means; said support means having a reservoir for collecting liquid; an elongated support member having one end secured to said support means; at least a pair of spaced mandrels secured to said support means with their axes in alignment, and operative to receive a tubular thermoplastic member for passage thereover; one mandrel of said spaced mandrels being furthest from said support means supporting conduit means which supplies pressurized air for pressurizing the interior of said tubular member advancing toward said mandrels; the remaining ones of said mandrels being larger in diameter than said one mandrel for expanding said tubular member; other conduit means extending through said support member for communicating with the interior of said tubular members between said mandrels to provide selective pressurization of the interior of said tubular member, drive rolls mounted closely adjacent to said support means for pulling said tubular member over said mandrels to provide biaxial orientation to said tubing; at least a pair of laterally spaced knives mounted on said support member for splitting said tubular member into a film; an annular mandrel means having its axis in alignment with the axes of said spaced mandrels and located between said knives and said spaced mandrels; said annular mandrel means mounted on said support member; said annular mandrel means having a diameter less than the most closely adjacent one of said remaining mandrels to provide a shrink-back in said tubular member; said support member supporting means for heating said tubular material as it passes over said spaced mandrels; and cooling means connected to said annular mandrel means to provide means for cooling the tubular material as it passes thereover.

8. An apparatus for manufacturing biaxially oriented film as set forth in claim 7 wherein said annular mandrel means is smaller in diameter than said adjacent mandrels in the range of 10 to 30 percent.

* * * * *